Inventor
Orello S. Buckner
By Clayton L. Jenks
Attorney

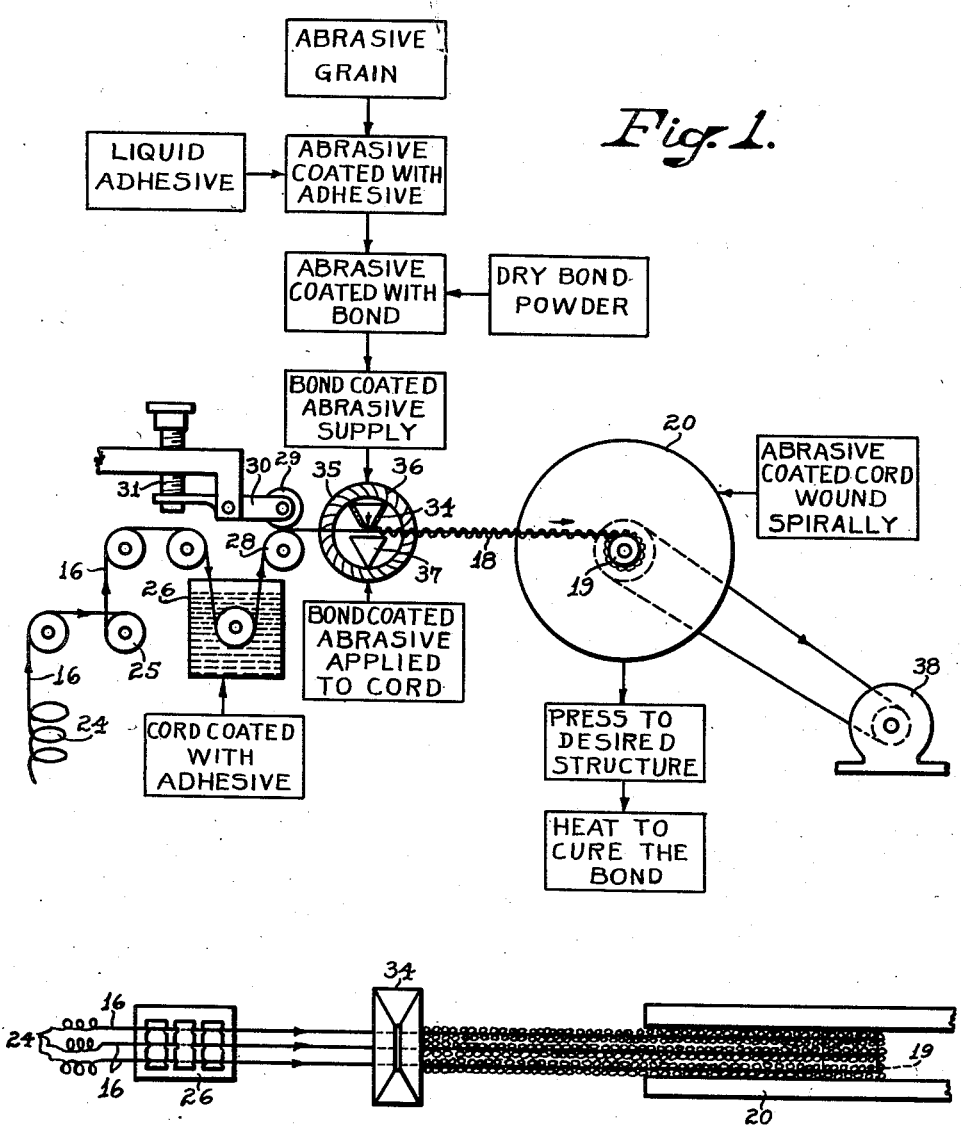

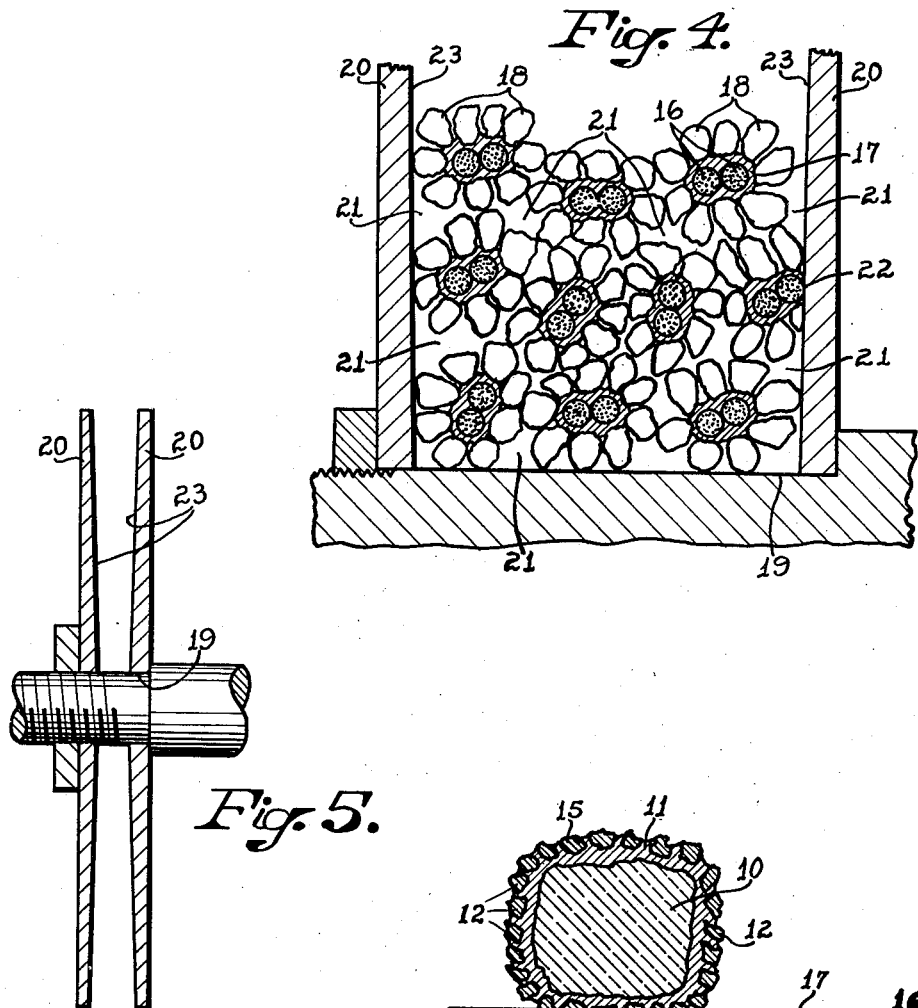

Patented June 30, 1953

2,643,945

UNITED STATES PATENT OFFICE 2,643,945

REINFORCED ABRASIVE ARTICLES AND METHOD OF MAKING THE SAME

Orello S. Buckner, Northboro, Mass., assignor to Bay State Abrasive Products Co., Westboro, Mass., a corporation of Massachusetts Application May 12, 1949, Serial No. 92,878

8 Claims. (Cl. 51—297)

This invention relates to abrasive articles and a method of making the same, and particularly to the manufacture of reinforced wheels made of abrasive grains united by a thermosetting organic bond.

There is a wide variety of grinding operations throughout the industry which require different types of organic bond and structure, and some are served best by a strong dense product, such as is made by the hot press method, and others by a porous body which may be made by the cold press method. Various processes are standard for producing such grinding wheels, with or without a precise measurable pore volume, which comprise abrasive grains bonded by the thermosetting organic bonds, such as the rubbers or the hardening resins; but they possess certain weaknesses inherent in the bond characteristics and may not have the strength required for safety in some types of heavy duty and high speed work. If, for example, a thin abrasive disk is used in the foundry for cutting off the sprue of a casting, any twisting torque or lateral pressure on the wheel may result in wheel breakage. Hence, the shape and structure of the wheel as well as the bond characteristics have heretofore limited the uses of such wheels, and particularly where both resiliency and strength are needed.

A rubber bonded wheel has been made customarily by milling a quantity of abrasive grains into a mass of vulcanizable rubber, either natural or synthetic, and this has formed after vulcanization a dense body whose strength is dependent largely on the cohesion of the rubber and the adhesion of the bond to the grains. In such a wheel, the smaller the proportion of the bond, the less is the wheel strength. Various procedures for making such wheels are disclosed in the prior art patents, such as the United States patents to Webster, No. 1,977,748 and to Martin, No. 2,022,893.

The standard hot press method of making a resin bonded grinding wheel comprises mixing the abrasive grains with a resin powder in the thermoplastic stage and melting the resin to coat the grains, and after breaking up the mass, the coated grains are pressed in a hot mold and heat cured under pressure. The heat and pressure cause the resin to melt and flow and so form a very dense structure which is not sufficiently porous for many grinding purposes. The cold press method, which is more suitable than the hot press method for making a porous wheel, involves wetting the abrasive grains with a resin solvent or plasticizing agent, such as furfural, and then mixing the dry resin powder therewith to coat the grains. The resin coated grains are pressed in a cold mold to the required shape and density, and the body is thereafter removed from the mold and heated to cure the resin, as is set forth in the U. S. patent to Martin, No. 2,010,873 of August 13, 1935. The porosity may be controlled by the method described in the U. S. patent to Howe et al., No. 1,983,082 of December 4, 1934.

The organic bonded wheels as thus made are subject to failure under certain grinding conditions and particularly if they have been built with a porous structure. It is, therefore, desirable to reinforce the organic bonded wheels with a medium which supplements the bond strength but does not interfere with the grinding action.

It has been proposed to make a reinforced wheel by winding cotton or woolen threads on a core while packing continuously on the surface being wound a cold setting fluid mass of abrasive grains in a slurry of magnesite and magnesium chloride, but such a wheel has serious limitations owing to the nature of the bond and to the method of manufacture. Various proposals have also been made to provide flexible or resilient wheels, but the problem of obtaining adequate strength has been difficult and a limiting factor.

The primary object of this invention is to provide an organically bonded grinding wheel, in which a controllable portion of its structure is replaced by a reinforcing medium which is destructible by the heat, friction or abrasion of the grinding operation, thus becoming automatically removed and rendering the cutting face of the wheel open, porous and fast cutting.

Another object is to provide a wheel made of abrasive grains bonded by a thermoset organic bond which is reinforced by a medium composed of readily destructible cord material that will not affect the grinding action detrimentally and wherein the cord, the grain sizes and the bond content are so related as to provide a strong wheel of required structure and cutting characteristics.

Another object is to provide a medium which both reinforces the wheel and serves as a quasi-pore, so that the wheel may have the cutting action of an open wheel and yet the strength of a dense wheel.

A still further object is to provide a readily destructible supplemental reinforcement for such a wheel which resists wheel rupture under high speed rotation and lateral pressure.

Another object is to provide a simple, economical and efficient method of making such a cord reinforced wheel having its abrasive grains united by a resin or rubber bond, or both, and in which the relationship of grains, bond and cord reinforcement is controlled. Other objects will be apparent in the following disclosures.

In accordance with this invention, an article of abrasive grains bonded by a heat matured potentially reactive organic bond is reinforced by one or more embedded cords, which extend preferably from near the central portion to the outer surface, and particularly in a substantially spiral arrangement. The wheel may be made by spirally winding the reinforcing cord on a core in a definite spaced relationship relative to the abrasive grains and bond, and preferably so that the cord is surrounded by substantially a single layer of abrasive grains, and the adjacent cord convolutions are spaced largely by approximately the average width of two grains and the associated bond, so as to provide a uniform grinding action. The wheel may be made by affixing the grains and a suitable potentially reactive, heat maturable organic bond, particularly an elastomer or a resin bond, on a strong cord and winding one or more of the abrasive coated cords substantially spirally to form a unitary body, and thereafter compressing the body to a controlled density, volume or structure, and heat maturing the bond. Preferably, the abrasive grains are initially coated with the bond, and the coated grains are cemented on the cord by an adhesive that is compatible with or forms a part of the bond. The reinforcing cord is formed of a strong fibrous or filament material, such as a strong cotton string and preferably a nylon cord, which is capable of volatilizing, disintegrating, melting, or otherwise readily disappearing or being destroyed in the grinding zone and so leaving an open space between the adjacent grains on the surface but which gives a high internal strength to the wheel.

Referring to the drawings, which illustrate two wheel structures and a method of making them:

Fig. 1 is a diagrammatic view illustrating a method and an apparatus suitable for making an abrasive wheel according to this invention;

Fig. 2 is a further diagrammatic view illustrating the method of preparing and winding a set of abrasive coated cords;

Fig. 3 is an enlarged diagrammatic view of a single strand cord having a single grain cemented thereon;

Fig. 4 is a diagrammatic sectional view illustrating the arrangement of the abrasive coated double strand cords as they are wound on the core;

Fig. 5 is a sectional view of the core and its confining flanges on which the abrasive coated cord is wound;

Figure 6:
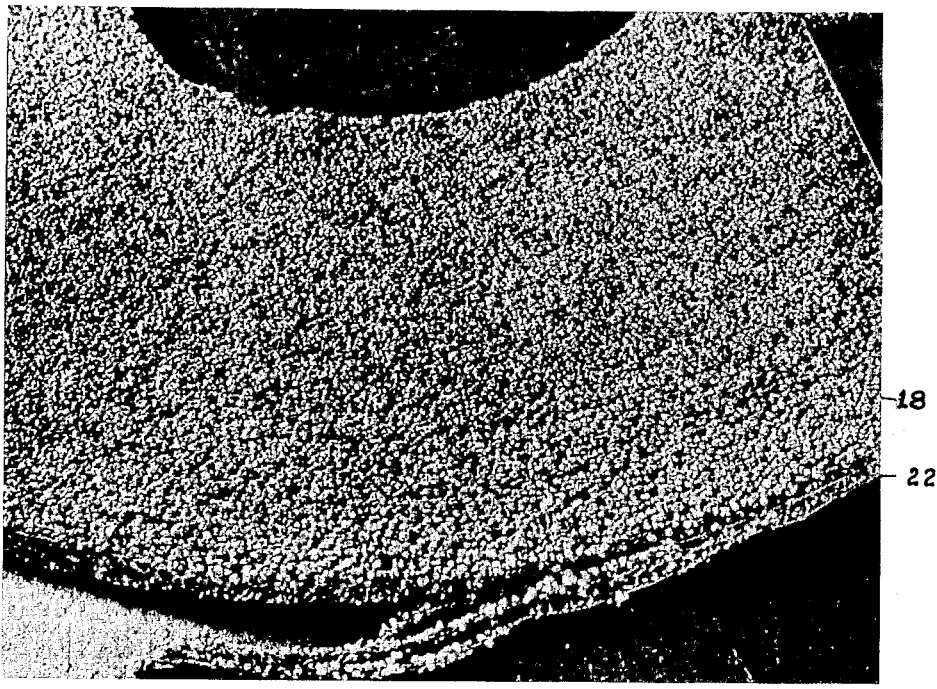
Fig. 6 is a photograph of a portion of the wheel structure after removal from the winding core but prior to pressing it and curing the bond.

One type of organic bonded abrasive wheel may be made by the method illustrated diagrammatically in Figs. 1 and 2. The abrasive grains may comprise any suitable material, such as silicon carbide or crystalline alumina or other natural or synthetic abrasive material. The grit sizes are selected in accordance with the grinding or cutting requirements; but it is preferred to employ grains of substantially the same size or to avoid the use of fines with the coarser sizes, since the fines tend to take up the plastic bond and prevent proper adhesion of the larger grains to the cord. In general, the grains are screened within size limits, such as those retained on a screen having 36 meshes to the linear inch, but which pass through the next larger standard screen.

The abrasive grains and a suitable potentially reactive organic bond are progressively built into a wheel body in such an association with a spirally wound reinforcing cord that the grains are primarily bonded to one another in the final product and the cord convolutions are arranged largely in a predetermined relationship to one or more layers of the grains. This is preferably accomplished by affixing a single layer of grains around a cord and then winding that grain coated cord substantially spirally. The grains may be cemented directly to the cord by a potentially reactive bond, but it is preferred to coat the grains initially with bond substance to provide a proper association and distribution thereof. To that end, the abrasive grains 10 (Fig. 3) of suitable material and grit size may be coated with a layer of a suitable adhesive 11 which secures in place a layer of the required bond 12. The adhesive 11 may be a resin plasticizing agent, such as furfural or cresylic acid, which is compatible with the selected bond and serves as a bond forming material. The resin bond coating 12 on the grains may be partially converted potentially reactive dry resin powder, such as the vinyl, Glyptal, urea, melamine or aniline resins, or preferably the phenol formaldehyde condensation product in the partially converted thermoplastic B stage. This provides a coated grain as a dry and easily handled material. Also, the abrasive grains may be coated directly with the resin bond by various other processes, such as by melting the B stage resin or other suitable thermoplastic material and tumbling the dry raw grains therewith, after which the mass is crushed to provide the individually coated grains.

In the preferred method of manufacture, illustrated in Fig. 1, the grains are first coated, as by tumbling, with furfural or other adhesion providing agent of bond forming characteristics. Then the wet surfaced grains are tumbled with a suitable resin powder, such as the partially converted, thermoplastic phenol formaldehyde B stage resin in the solid dry powder condition. This powder 12 adheres to the plastic adhesive coating 11 on the grains and thus forms a dry surfaced aggregate of powder on the grain. The resin content is controlled to insure the minimum of free resin dust, which would tend to adhere to the cord and prevent adhesion of the coated grains thereto. For example, 0.5 pound of the furfural and 2 pounds of the B stage resin will coat 16 pounds of 24 grit size crystalline alumina grains. These proportions may be widely varied.

These resin coated abrasive grains 15 are in turn employed to coat a cord 16 (Fig. 3) of suitable material and size, as herein set forth. This cord may be a mono-filament or it may be made of a single strand of fibres, ordinarily twisted together; or as illustrated in Figs. 4 and 6, it may comprise two strands twisted together, or a larger number if desired. In order to secure the coated grains to the cord, the latter is in turn coated with a layer 17 of a suitable adhesive or agent which develops adhesion, and especially one which is compatible with the resin or rubber or other bond employed. The adhesive may, for example, be a solvent or plasticizer for the resin coating on the grains, such as furfural, acetone and alcohol, or cresylic acid. It may in particular be one of the natural or artificial resins, such as the potentially reactive phenol, Glyptal, vinyl, melamine, urea or aniline resins in a plastic potentially reactive state, such as the liquid A stage phenol formaldehyde condensation product or other bonding material which is capable of uniting integrally with the bond coating on the grains. The total quantity of the bond in the wheel may be controlled by varying the thickness of the bond coatings on the individual grains, taking into account the nature and quantity of the adhesive used to fasten the grains to the cord.

One or more cords, coated preferably with a single layer of the abrasive and bond aggregate 18 as indicated in Figs. 4 and 6, are wound on a core 19 (Fig. 1) between positively rotated confining flanges or plates 20 so as to form an intermediate stage structure capable of being subsequently pressed and heat hardened to the required final condition. A single coated cord or several cords, separately coated, may be wound substantially spirally, as in a spiral or helical formation, either orderly or in a haphazard manner, so as to form an open structured body with the cords still carrying the layer of coated grains. These are ordinarily so arranged that the two adjacent convolutions of the twisted cords (Figs. 4 and 6) are largely separated by two abrasive grains and the associated bond, one cemented to each cord. The double strand twisted cord is shown at the free ends at the bottom of Fig. 6, where the grains have been accidentally dislodged. The sectional view in Fig. 4 shows the two twisted strands that make up each cord. The grain and bond aggregates 18 are separated by pore spaces 21 in this intermediate stage product, as indicated by the dark spaces in Figs. 6 and 7.

If the wheel is very thin, only a single cord is employed, and the cord diameter and the size of the abrasive aggregate may be coordinated to provide a wheel having the width of the cord and its two aggregates on its opposite sides, as well as the required wheel characteristics. For a wider wheel, it is preferred to use a plurality of cords wound substantially spirally and in parallelism, instead of winding a single cord helically while moving it back and forth like a sewing thread on a bobbin, although the latter method may be used. In each arrangement, the cord is in a substantially spiral formation.

The number of cords is determined primarily by the wheel thickness relative to the size of the abrasive and bond aggregate 18 which is cemented on the cord. That is, if the unpressed wheel is to be 0.25 inch thick and the abrasive and bond aggregate averages about 0.047 inch in diameter, two cords of 0.03 inch total diameter with their adhesive coating may be laid side by side without disturbing the abrasive aggregates materially. A suitable cord of sufficient surface area for carrying the resin bond and the 24 grit size grains may consist of a double strand of 210 denier untwisted nylon having 34 individual filaments per strand, the two strands being twisted together to form a continuous cord which is about 0.03 inch thick. The individual filaments of each strand and the helical groove between the strands form a large surface area for the adhesive contact of the fluid coating which holds the abrasive grains and bond in place.

The cord size as well as the characteristics of the filaments or strands may be varied widely to give the strength and the quasi-pore volume that are deemed best adapted for a given type of grinding or cutting action. Instead of increasing the size or the strength of the coated cord, I may wind one or more cords of the same or a different size and strength with the abrasive coated cord. The supplemental cords are not coated with abrasive but may, if desired, be coated with bond. This modifies the quasi-pore and bond volumes. This additional cord becomes embedded in the abrasive and bond content of the wheel and lies between the abrasive coatings on the other cords. Supplemental bond may be initially coated on the extra cord, or bond may be added during the winding operation. This provides a wheel having the equivalent of an open structure or a high pore volume, but which may be made by the hot press method, so that the bond and grains are in close contact and are strongly united and yet the wheel acts like an open structured wheel.

When two or more cords are wound side by side, they may twist or otherwise move into various haphazard positions, so that here and there a cord 22 (Figs. 4, 6 and 7) may be exposed on the surface and some of its grains may be stripped off and scattered on the mass being wound; but the major effect is that of an orderly spiral and parallel winding of each cord. The abrasive coated cord is not guided near the winding zone, since a guide would strip off some of the grains, and the natural lay of the coated cords is considered to be an advantage. As the cords with their coatings of abrasive and bond aggregates are wound on the positively driven core, the tension tends to force the abrasive and bond aggregates into position on the previously wound part of the wheel and against the inner surfaces 23 of the confining flanges 20. Hence, a tapered wheel may be made which provides for proper clearance in the cut, in that the center portion of the wheel is narrower than the cutting periphery, as indicated in Fig. 5. That is, the two flanges 20 may be shaped to provide a slight reverse taper so that the thickness of the wheel at the circumference is from 0.15 inch to 0.35 inch larger than at the hole.

Any suitable machine may be employed to coat the cord and wind it. As shown diagrammatically in Figs. 1 and 2, three bobbins 24 deliver their separate cords to a friction and tension retaining roller 25. From here, the cords pass over grooved guiding rolls and through one or more tanks 26 containing the fluid cementitious coating material, such as the potentially reactive phenol formaldehyde condensation product in the A stage or a suitable modification thereof, which has a high viscosity and so is capable of retaining a large amount of the abrasive and bond mixture. The thickness of the coating on the cord may be regulated by passing it through a die or gate, such as is provided by the two grooved rollers 28 and 29. The latter roller is adjustably mounted above the grooved roller 28, and the distance of separation of the upper roller or gate member is carefully adjusted to wipe off any excess of the liquid bond. This may be accomplished by mounting the roller 29 on the end of a lever 30 pivoted centrally on a frame support and adjusting the tilt of the lever by the screw 31. Each cord is confined between the opposed grooves on the rollers 28 and 29, and the size of the passage is varied according to the space of the rollers. Various other expedients may be adopted for the purpose of insuring a proper thickness of bond coating on the cord.

Each cord travels from the rollers 28 and 29 directly beneath a spout 34 where it passes through a stream of the dry bond coated abrasive grains previously prepared for the purpose, and the solid abrasive and bond aggregates are caught by the plastic adhesive on the cord and held in place as a fairly uniform coating. The bond coated grains may be supplied to the spout 34 from an outside source, and the excess is returned by the positively rotated hollow cylinder 35, which has lifting vanes 36 on its internal periphery arranged to receive the grains from a downwardly projecting spout 37 located beneath the cord to collect the excess and so return it to the upper spout 34. Thus, the cord 16 receives its coating of aggregates 18 without being touched by hand or the coating mechanism. Other suitable apparatus may be employed for the purpose. From the coating zone, each cord surrounded by its abrasive and bond aggregates passes untouched directly to the core 19 on which it is wound.

The core 19 is rotated by a suitable motor mechanism 38 and preferably at a uniform linear rate which maintains each cord under the required tension as it is being wound spirally thereon. It is desirable to maintain a substantially uniform tension on each cord as the wheel diameter grows. Various mechanical and electrical expedients may be employed to wind the cord at a uniform linear rate and under adequate uniform tension. This may be accomplished by means of the standard or suitable wind up mechanism, such as friction drives or electrically governed speed control devices.

Figure 7:
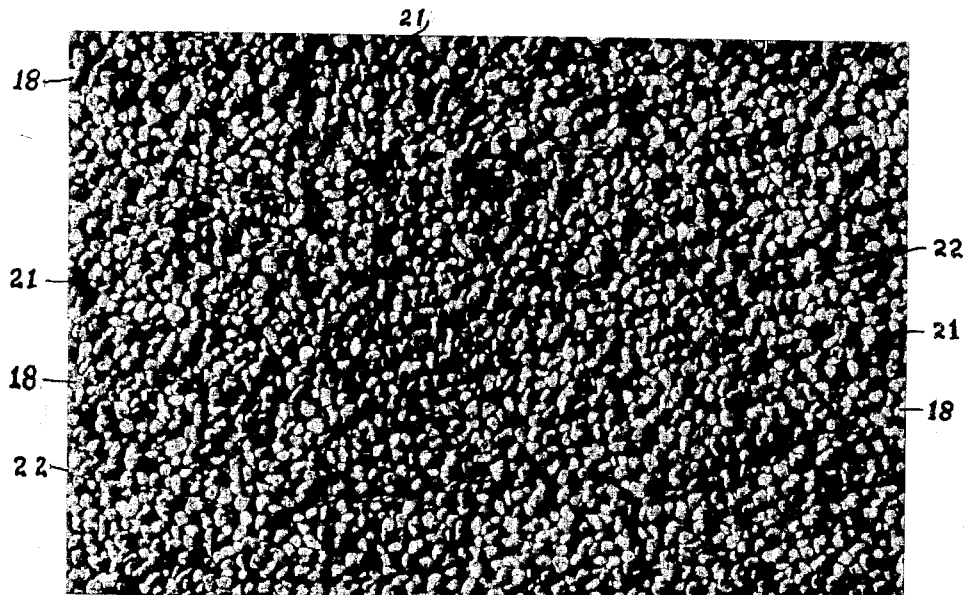
Fig. 7 is an enlarged photographic view of the structure of Fig. 6.

The wheel at the end of this intermediate stage presents a very rough appearance, as shown in Figs. 6 and 7, with the abrasive and bond aggregates held in an open structure and with the cords showing here and there at both the periphery and the lateral sides of the wheel; but the cords are arranged in a fairly regular spiral winding with the convolutions closely and evenly spaced, so that the cords are substantially circumferential of the wheel during its reduction in size while grinding. That is, the cords are close together because only about two abrasive grains are located between them, so that each convolution of the spiral is nearly concentric with the wheel at its periphery.

The wheel bond at this point in its manufacture is in an intermediate or potentially reactive stage, and the wheel may include large pores 21, the volume of which depends somewhat on the cord tension. This porosity is reduced by pressing the body to a desired thickness and predetermined density or pore volume. Ordinarily, the wheel is pressed to the maximum density, or as such wheels without the cord are usually treated. Prior to pressing, the wheel may be dried at a suitable temperature, such as 160° F. for 12 to 36 hours to remove volatiles and to advance the A stage resin to the thermoplastic B stage. Then, it may be compacted in a mold under a pressure of 1 to 2 tons, more or less, per square inch, which eliminates most of the pore spaces 21. The pressure is usually applied laterally or axially of the wheel body. The hot press method may be employed to obtain a wheel body of high density having a pore volume which may be substantially zero and ordinarily less than 3% of the total. In this case, the wheel is heated while being pressed, such as at a temperature of 290° to 320° F. and for 1 hour. The heating step is prolonged as needed to insure a complete conversion of the bond ingredients to the final hardened, infusible condition. The nylon cord in the dense wheel as above made forms from 6 to 12% of the total volume, and this is the quasi-pore volume.

A grinding or cutting off wheel having abrasive grains bonded with rubber may be made in accordance with the procedure explained above. For example, the abrasive grains of selected sizes may be coated to a desired thickness with a suitable vulcanizable rubber compound, comprising either natural or synthetic rubber. This may be done by tumbling a mass of abrasive grains in a tumbling drum with a solution of the rubber compound in naphtha or other suitable solvent, together with powdered sulfur and a vulcanization accelerator, if desired. The coated grains may be dried and then recoated a desired number of times to increase the thickness of the coating.

Thereafter, the rubber coated abrasive grains are cemented to the cord. For example, the cord may be passed through a bath of a suitable adhesive, such as the liquid A stage phenol formaldehyde resin, and then passed through a stream of the rubber coated abrasive particles so that the particles will adhere to the plastic or adhesive surface layer on the cord. After the abrasive coated cord or cords have been wound spirally, the mass may be hot pressed in a mold maintained at a temperature from 290° to 320° F. for 1 hour or more to vulcanize the rubber and thermoset any resin used. The various procedures which are suitable for making rubber bonded wheels may be used.

Figure 8:
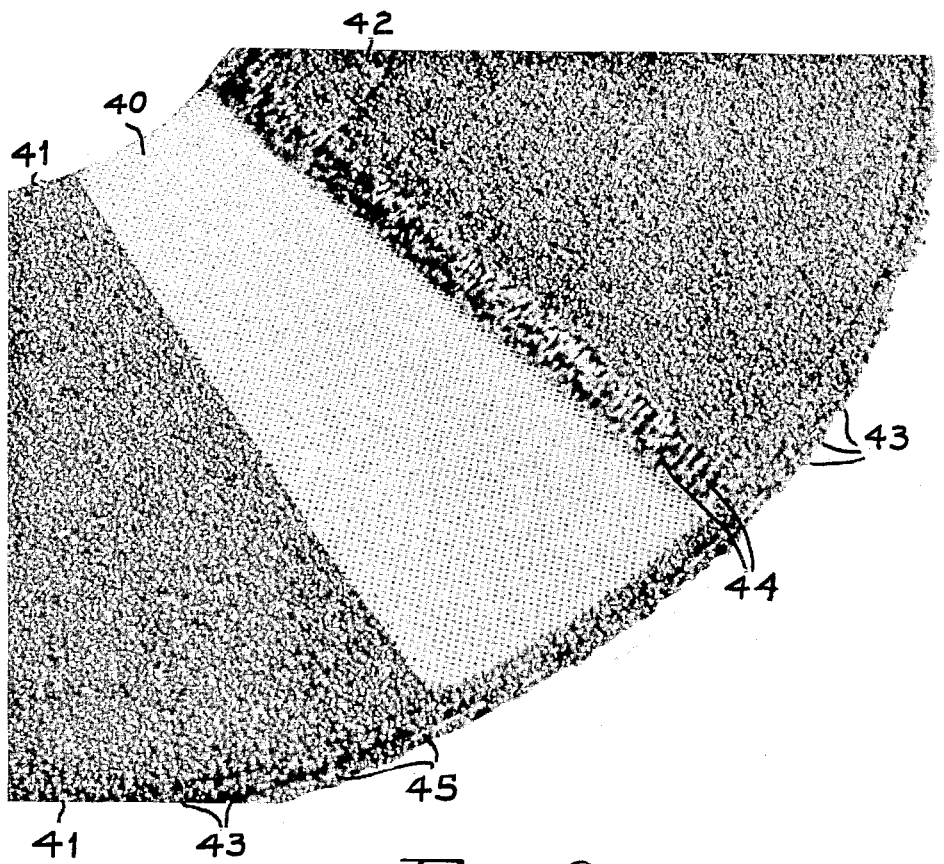
Fig. 8 is a fragmentary photographic view of a wheel having both a spirally wound cord and a fabric reinforcement therein.

In order to provide a wheel which is capable of resisting exceedingly rough usage, I incorporate therein a further reinforcement as illustrated in Fig. 8. This comprises one or more layers of a thin perforate disk or sheet 40, such as a woven fabric, of high strength and made preferably of the type of reinforcement employed for the cords and which will disappear readily at the periphery and not interfere with the grinding operation. This supplemental reinforcing sheet has perforations or weave spaces through which the bond substances on the opposite sides may unite and form an integral wheel structure. It is preferably a fabric having either an open or a closely woven mesh which is made of strong threads formed of monofilaments or multiple fibre strands of cotton, wool or linen or synthetic organic fibres or filaments of rayon, nylon or the like. One suitable fabric is an nylon netting having 21 x 21 meshes per linear inch, which is woven of double strands of 210 denier nylon thread having 34 individual filaments per strand. The fabric is located centrally of the wheel, parallel with its side faces, and between two abrasive coated cords.

One type of wheel may be readily made by producing two separate abrasive and cord disks 41 and 42, Fig. 8, according to the above described procedure. The disks comprise abrasive grains 43 coated on two sets of spirally wound cords 44 and 45 in the two separate disks. Before pressing either disk, they are assembled with one or more layers of the perforate sheet or fabric 40 located therebetween. Fig. 8 shows the construction with one disk cut away to expose the reinforcing fabric 40. Pressing this laminated structure thereafter in a hot press forces the bond through the perforations or mesh openings between the woven fabric strands and thus unites the two abrasive layers integrally. The other steps of the procedure may be as above described, so that the final product is an integral body having sets of abrasive coated cords on each side of the supplemental reinforcing fabric. When this type of wheel is subjected to severe breakage tests, it is found that after the wheel has broken, the inner fabric layer prevents the detachment and dangerous flying apart of the fragments. This provides an increased factor of safety. The fabric or other reinforcing medium serves primarily to resist lateral pressure tending to rupture the wheel, and its strands provide further strength substantially radially of the wheel or against centrifugal force.

Various substances may be used for the reinforcing cord, such as cotton, linen, wool, nylon and rayon, depending on the wheel properties desired. For example, a cotton cord of the type used to reinforce automobile tire casings may be used. One of the preferred cords for strengthening cut off wheels, as well as heavy duty grinding wheels, is a substance termed nylon, which is not only very strong but melts or volatilizes at the temperature of the grinding zone. Nylon is made by heating in an autoclave a mixture of adipic acid and a diamine salt and extruding the mass as a filament. The product is a long chain synthetic polymeric amide having recurring amide groups as an integral part of the main polymer chain and in which the structure elements in the filament are oriented in the direction of the filament axis. Nylon yarn of high tenacity formed of Dupont fibre 66 comprises a bundle of smooth, solid, fine, cylindrical fibres which may be twisted into a yarn, with or without an adhesive size. The high tenacity yarn has a tenacity as high as 7 grams per denier or 100,000 pounds per square inch. Its true elasticity is about 8%. If stretched more than 8% of its length, it tends to creep back slowly without material impairment of its strength. The denier and filament count may be varied widely. For example, a denier of 20, single filament, type 200 Dupont nylon, provides a tenacity of 5.2 to 5.5 grams, while a denier of 200, filament count of 34 (type 300) provides a tenacity of 7.3 to 7.7 grams per denier. Hence, the characteristics of the cord may be varied to meet the wheel requirements, and particularly the cord strength and the surface area needed to cement the grains in place. This nylon material has the quality of high tensile strength and yet sufficient resiliency to provide a reinforcement for the abrasive wheel which lends some degree of flexibility or resiliency thereto. The nylon can stretch without increasing its longitudinal tension materially and yet will return to its original form or length when released. Hence, it provides a uniform tensile property which is particularly useful to reinforce an abrasive wheel.

The thread or cord used in the wheel provides, from an abrasive structure standpoint, a continuous pore structure within the wheel, since it is readily removed by the grinding action at the cutting face of the wheel and so provides or serves like a non-abrasive space where exposed. The destructible cord, whatever material is used, serves as a pore space, since it forms a quasi-pore or continuous channel within the bond which terminates in an open channel at the periphery and thus provides a space between the grains and forms a rough, free cutting grinding surface. Hence, the cord is to be considered as part of the pore space. If the cord is nylon, it melts or volatilizes at about 450° C. and so disappears readily at the grinding zone, whether by disintegration or by heat treatment. The other organic types of cords above specified are likewise destroyed, as by disintegration, at the periphery. If two cords, for example, are each coated with abrasive grains and then wound spirally side by side to form a narrow cut off wheel, they will form the equivalent of two spiral and substantially circumferential channels through the wheel, which are separated by two grain spacings both radially and spirally, and the adjacent grains will be cemented together in pairs laterally and radially so that, as the wheel wears down on the surface, there will be two grooves at the surface in which no bond is present, and the grains at each side of these grooves will be exposed at their sides so as to leave them quite free cutting. Hence, a cut off wheel assumes an irregular or grooved circumferential surface which is rough and free cutting as it wears away. Primarily, the nylon cord serves interiorly of the wheel as a very strong reinforcement of high tensile strength, but that reinforcement disappears at the periphery under the abrasions and heat of grinding and so provides the required open structure at the surface.

The following table illustrates the superiority of wheels made within the scope of this invention over wheels made according to the prior art, or where there is no quasi-pore reinforcing structure and no layer of perforate sheet between adjacent abrasive laminae. Two critical factors which indicate the differences between abrasive articles are (a) the surface feet per minute at which the article bursts due to rotative stresses and (b) the length of time a relatively thin wheel of large diameter, such as a cut-off wheel, will resist lateral flexure to a predetermined degree while rotating at a selected operating speed. These are most important as an indication of safety for the wheel operator. Comparative tests were made between several types of cut-off wheels of resin bonded crystalline alumina abrasive, which were substantially alike in composition and otherwise similar with respect to as many components as possible, and particularly as regards the type and amount of abrasive grit and the type and amount of adhesive bond.

*Table I*

| Wheel No. | Type of Cut-Off Wheel | Volumetric Percentage Composition of Wheel | | | Bursting Speed (S. F. M.) | Operation time in mins. at 16,000 S. F. M. | |
|---|---|---|---|---|---|---|---|
| | | Abrasive | Bond | Pores | | Before Breakage | No Breakage |
| 1 | Standard | 51 | 49 | 0 | 24,000 | 0.3 | |
| 2 | do | 52 | 32 | 16 air | 16,000 | 0.015 | |
| 3 | do | 42 | 50 | 8 air | 22,000 | 2.32 | |
| 4 | Non-Laminated, Cotton Cord | 42 | 50 | 8 quasi-pores | 24,000 | | 35.0 |
| 5 | Non-Laminated, Nylon Cord | 42 | 50 | do | 20,000 | | 35.0 |
| 6 | Laminated, Cotton Cord | 39 | 46 | 15 quasi-pores | 31,000 | | 35.0 |
| 7 | Laminated, Nylon Cord | 39 | 46 | do | 30,000 | | 35.0 |
| 8 | do | 37 | 45 | 18 quasi-pores | 33,000 | | 35.0 |

These wheels were 16 inches in diameter and about 3/16 inch thick and of the type used for cutting off metal parts. Their volumetric compositions were as indicated in the above table. Wheels 1, 2 and 3 were made in accordance with standard practice. Wheels 4 and 5 were made according to the disclosures of Figs. 1 to 7 inclusive, that is, without the laminated structure of Fig. 8, but wheel 4 was reinforced with cotton cord and wheel 5 with nylon cord as above described. Wheels 6, 7 and 8 were made as shown in Fig. 8 and were reinforced with cotton or nylon cord as above described. Each wheel was subjected during rotation to lateral pressure near its periphery which caused a deflection of 1/8 inch. Wheels 1, 2 and 3, of the type which normally burst at the indicated speeds, broke quickly at 16,000 S. F. M. when deflected; but wheels 4 to 8, inclusive, were not broken by the lateral pressure although they were run for 35 minutes at the 1/8 inch deflection. The wheels made according to my invention were broken only by the centrifugal force of the indicated high speeds. The time required to cause rupture by the lateral deflection was not determined, but there were no indications of incipient breakage at the end of the 35-minute period. Hence, wheels made in accordance with my invention are not only capable of resisting the high speeds which lead to bursting, but in an even more important respect, they resist a severe lateral deflection of the periphery as is often caused in a normal cutting-off operation, such as where casting sprues are being removed. This is confirmed by practical use in the industrial field where the hazard of injury to the operator by wheel breakage has been largely removed.

Another advantage lies in that this invention provides a safe means of obtaining a greater service from a given quantity of abrasive by employing a higher operating speed, such as 16,000 surface feet per minute, which is readily usable with my wheels. To illustrate this, tests were conducted under controlled conditions with cutting-off wheels of the same characteristics as wheels Nos. 2, 3, 4 and 5 of the above table. The wheels were operated at peripheral speeds of 11,200 and 16,000 surface feet per minute, as indicated in the following Table II. The amount of metal removed per unit of abrasive consumed is expressed as unity (1) for the 11,200 S. F. M. peripheral velocity and as the numerical amount greater than unity when the wheel is used at 16,000 S. F. M. peripheral velocity.

*Table II*

| Wheel No. | Efficiency Factor— | |
|---|---|---|
| | at 11,200 S. F. M. | at 16,000 S. F. M. |
| 2 | 1 | 1.8 |
| 3 | 1 | 1.8 |
| 4 | 1 | 1.3 |
| 5 | 1 | 1.2 |

However, wheels Nos. 2 and 3 are positively unsafe to use commercially at this speed of 16,000 surface feet per minute, but wheels Nos. 4 and 5 are safe. The rate at which metal is cut is larger for the faster speed, in the same order of magnitude as for the increase in efficiency. It is also to be noted that the standard wheel No. 2, which had 16% of pores of air broke at 16,000 surface feet per minute; whereas my laminated wheel No. 7 with 15% quasi-pores (approximately the same pore volume) broke at 30,000 surface feet per minute, thus showing the value of the quasi-pore substance as a reinforcing medium.

Wheels made according to my invention may be run safely for cutting or grinding at speeds that have been heretofore impractical, such as 16,000 surface feet per minute, with the consequent advantage of the high peripheral speed as evidenced by very rapid, time-saving cutting, and without the danger of wheel breakage due to lateral pressure or accidental or intentional twisting of the work pieces. So strong is this type of reinforced wheel that it is difficult to break it by severe lateral blows. A porous wheel having from 5 to 30% or a greater percentage of pore volume can be strengthened similarly to resist high rotational speeds at which the grinding efficiency is high. Without the cord, a wheel of such high porosity would not be safe at high speeds. The laminated wheel of Fig. 8 may have a quasi-pore volume up to 15% or more, although the bond and abrasive have been compacted during hot pressing to substantially zero actual porosity, i. e. below about 3%, so that the wheel acts like a cold pressed porous wheel although having the characteristics of a hot pressed body.

Many modifications may be made in the process, such as are set forth in the above mentioned patents, and various mixtures of organic bond substances are available, provided the materials are compatible with one another and with the reinforcing cord. By varying the material of the bond as well as the diameter of the cord, wide variations may be made in the structure and grinding ability as well as the wheel strength. This construction in every case comprises the strengthening cord with an organic bond which gives a highly dense structure or a structure of controlled porosity and wherein the cord strengthens either the dense wheel or the porous wheel to make it safer for heavy duty purposes than has heretofore been provided.

I claim:

1. An abrasive wheel comprising at least one, non-woven, individual, continuous, reinforcing cord of high tensile strength which is readily destroyed by a normal grinding operation when exposed at the wheel periphery, a thermostat precoating of a heat hardenable organic bond on the cord, abrasive grains precoated with an organic bond secured individually on and around the cord by said bond, said cord with its grain coating being in a wound, substantially spiral arrangement and forming the wheel structure, the cord convolutions extending from the central portion of the wheel towards the periphery and being largely spaced from one another by the abrasive grains, a heat reacted organic bond between and uniting the adjacent grains, the organic bond on the grains and the cord selected from the group consisting of resin and rubber, the wheel body of cord, bond and grains having a high density and a low actual porosity in which the cord provides a quasi-pore volume greater than the porosity and an open grinding structure at the periphery and serves as a reinforcement of high resistance to breakage by lateral pressure and centrifugal force.

2. An abrasive wheel according to claim 1 in which the reinforcement comprises a plurality of substantially parallel, spirally and haphazardly wound abrasive coated cords, the bond is a thermoset resin and the wheel has an axially compacted, dense structure of cord, bond and grains with an actual porosity of not over 3% by volume.

3. An abrasive wheel comprising at least one, non-woven, individual, continuous reinforcing cord of high tensile strength which is readily destroyed by a normal grinding operation when exposed at the wheel periphery, an adherent precoating of a heat hardenable resin bond thereon, abrasive grains, each of which has an individual precoating of heat hardenable resin bond, said coated grains being secured individually and initially on and around the cord by said bonds, said cord with its adhering grains being in a wound, substantially spiral arrangement and forming the wheel structure, the cord convolutions extending from the central portion of the wheel towards the periphery and being largely spaced from one another by the abrasive grains, the bond on the cord and the coatings of adjacent grains being thermoset in integral contact and uniting the grains and cord as a rigid structure, the wheel body of cord, bond and grains being axially compacted and having a high density and a low actual porosity of not over 3% by volume in which the cord provides a quasi-pore volume greater than the porosity and an open grinding structure and serves as a reinforcement of high resistance to breakage by lateral pressure and centrifugal force.

4. A laminated reinforced abrasive wheel comprising abrasive disks arranged side by side, each disk having at least one non-woven, continuous, reinforcing cord of high tensile strength which is readily destroyed by a normal grinding operation when exposed at the wheel periphery, an adherent precoating of abrasive grains and a resin bond on and around the cord, said cord with its grain coating being in a wound substantially spiral arrangement with the cord extending from the central wheel portion to the periphery and the grains largely separating the cord convolutions, the bond being a thermoset resin material which unites the grains to the cord and to one another, at least one perforate reinforcement sheet arranged between the adjacent disk surfaces, a thermoset resin bond within and projecting through said reinforcement sheet which adheres to and unites the disks as an integral laminated structure, said structure being in an axially compacted condition of high density and a low actual pore volume and the cords serving as quasi-pores.

5. An abrasive wheel according to claim 4 in which each grain has a precoating of a heat hardenable resin bond and the perforate sheet is a textile fabric, the bond being thermally set and uniting the grains to each other and impregnating the fabric and securing the disks integrally together, the wheel being axially compacted to a thickness of not over 0.25 inch and an actual porosity of not over 3% by volume.

6. The method of making a grinding wheel comprising the steps of initially coating abrasive grains with a potentially reactive, heat hardenable organic bond, progressively coating a single, continuous, readily destructible, non-woven, reinforcing cord of high tensile strength with a heat settable, adherable, plastic, organic bonding cement that is compatible with said bond, progressively applying the coated grains to the cement on and around the cord, thereafter feeding at least one grain coated cord forward and winding it in a substantially spiral convolution without materially disturbing the grains on the cord and forming a porous wheel body, pressing the body axially to a required density and heating the body to thermoset the bond and cement and form an integral cord reinforced wheel structure.

7. The method of making an abrasive wheel according to claim 6 in which a plurality of reinforcing cords are separately coated with bond and abrasive grains, and the coated cords are drawn forward under a restraining tension in a spaced parallel relationship and progressively wound spirally side by side between confining flanges and on a rotating core and in a haphazard positioning except as affected by contacting with the flanges, after which the wheel body is compacted only laterally to a higher density and lesser thickness without materially disturbing the cord convolutions and the enveloping grains.

8. The method of making an abrasive wheel comprising the steps of coating adhesive grains with a plastic potentially reactive, heat hardenable organic bond, progressively coating a plurality of readily destructible, non-woven, separate, reinforcing cords of high tensile strength with a heat hardenable, adhesive, organic bonding cement, progressively cementing the coated grains to and around the cords, forming each of a plurality of disks separately by winding at least one of said reinforcing abrasive coated cords substantially spirally without materially disturbing the grains on the cord and forming a body having the cord convolutions largely spaced by the grain coating, assembling the disks as a laminated structure with a reinforcing, readily destructible fabric of coarsely woven, readily destructible cords of high tensile strength located therebetween, compressing the structure axially and forcing the bond into and through the perforations of the fabric and uniting adjacent disks as a dense body and subsequently heat hardening the bond and forming a unitary structure.

ORELLO S. BUCKNER.

References Cited in the file of this patent

UNITED STATES PATENTS

| Number | Name | Date |
|---|---|---|
| 334,671 | Laughton | Jan. 19, 1886 |
| 704,789 | Elson | July 15, 1902 |
| 1,860,724 | Schumacher | May 31, 1932 |
| 2,031,158 | Goodhue | Feb. 18, 1936 |
| 2,031,280 | Reed | Feb. 18, 1936 |
| 2,078,436 | Anderson | Apr. 27, 1937 |
| 2,335,902 | Ball et al. | Dec. 7, 1943 |